(12) United States Patent
Kinnen et al.

(10) Patent No.: US 8,579,302 B2
(45) Date of Patent: Nov. 12, 2013

(54) VERSATILE MATERIAL HANDLING SYSTEM

(75) Inventors: Dale E. Kinnen, Boston Heights, OH (US); Richard Meeker, Lewis Center, OH (US); Ray Kuchman, Milford, OH (US); Thomas Reims, Milford, OH (US); Scott T. Wood, Youngstown, OH (US)

(73) Assignees: PolyOne Corporation, Avon Lake, OH (US); United Wood Products, Youngstown, OH (US); Buckhorn, Inc., Milford, OH (US)

( * ) Notice: Subject to any disclaimer, the term of this patent is extended or adjusted under 35 U.S.C. 154(b) by 447 days.

(21) Appl. No.: 12/601,218

(22) PCT Filed: Jun. 3, 2008

(86) PCT No.: PCT/US2008/065639
§ 371 (c)(1),
(2), (4) Date: Nov. 20, 2009

(87) PCT Pub. No.: WO2008/154219
PCT Pub. Date: Dec. 18, 2008

(65) Prior Publication Data
US 2010/0164191 A1 Jul. 1, 2010

Related U.S. Application Data

(60) Provisional application No. 60/942,723, filed on Jun. 8, 2007.

(51) Int. Cl.
*B62B 1/10* (2006.01)
*B62B 1/12* (2006.01)
*B62B 1/16* (2006.01)

(52) U.S. Cl.
USPC ............... 280/47.2; 280/47.131; 280/47.17; 280/47.24; 280/47.27; 280/47.29

(58) Field of Classification Search
USPC .......... 280/47.27, 47.28, 47.2, 47.29, 47.131, 280/47.16, 47.17, 47.18, 47.24
See application file for complete search history.

(56) References Cited

U.S. PATENT DOCUMENTS

| | | |
|---|---|---|
| 3,677,200 A | 7/1972 | Coccagna et al. |
| 4,239,249 A | 12/1980 | Sprague |
| 4,398,902 A | 8/1983 | Mangum |
| 4,694,962 A | 9/1987 | Taub |
| 5,042,962 A | 8/1991 | Lechnir |
| 5,266,148 A | 11/1993 | Keech et al. |

(Continued)

FOREIGN PATENT DOCUMENTS

| | | | |
|---|---|---|---|
| EP | 294249 A1 * | 12/1988 | ............... B62B 1/12 |
| JP | 63013908 U1 | 1/1988 | |
| JP | 09249128 | 9/1997 | |
| JP | 2005075642 | 3/2005 | |

*Primary Examiner* — Hau Phan
*Assistant Examiner* — Bryan Evans
(74) *Attorney, Agent, or Firm* — John H. Hornickel

(57) ABSTRACT

A material handling system is disclosed, having at least one solid rectangular storage container for liquid or solid items; a pallet upon which the container sits; and a transporter which is adapted to move the container from the pallet. The pallet has a structure to permit both movement of the pallet and the container and movement of the container independent of the pallet. The transporter with the container can be moved safely and easily using human power.

11 Claims, 3 Drawing Sheets

(56) References Cited

U.S. PATENT DOCUMENTS

| | | | |
|---|---|---|---|
| 5,485,069 A * | 1/1996 | Otsuki et al. | 318/570 |
| 6,112,672 A * | 9/2000 | Heil | 108/55.3 |
| 6,123,162 A | 9/2000 | Rodriguez et al. | |
| 6,135,466 A * | 10/2000 | Irwin | 280/47.27 |
| 6,352,039 B1 | 3/2002 | Woods et al. | |
| 6,357,654 B1 * | 3/2002 | Gardner et al. | 229/122.32 |
| 6,435,108 B2 | 8/2002 | Braley | |
| 6,554,300 B1 * | 4/2003 | Ziolkowski | 280/47.27 |
| 6,557,869 B2 * | 5/2003 | Gillette et al. | 280/47.28 |
| 2003/0151218 A1 * | 8/2003 | Swaffield | 280/47.27 |

* cited by examiner

VERSATILE MATERIAL HANDLING SYSTEM

CLAIM OF PRIORITY

This application claims priority from U.S. Provisional Patent Application Ser. No. 60/942,723 bearing and filed on Jun. 8, 2007, which is incorporated by reference.

FIELD OF THE INVENTION

This invention relates to a material handling system for the movement and storage of corrugated paper boxes on pallets using both forklift trucks and hand trucks.

BACKGROUND OF THE INVENTION

Manufacturing facilities need to move and store vast quantities of raw materials and finished goods. When either the raw materials or the finished goods or both are small in solid size or are liquid in form, economies of scale dictate that they be stored and moved in containers. Those same economies of scale cause such containers to be enormously cumbersome.

A forklift truck in a warehouse or manufacturing floor is a common sight, moving material on pallets from one location to another. The hydraulic or electric power is well used because the pallets are often stacked for efficient storage and the pallets are a well-recognized way to transport the goods from one location to another. The pallet can be made of sturdy wood, metal, plastic, or corrugated paper and serves merely as a facilitator of storage and movement.

Likewise, the container for the small solids or liquids is a well-recognized way to move and store such materials. Likewise, the container is another item that serves merely as a facilitator of storage and movement, i.e., material handing. Containers can assume all solid geometry shapes. Solid cylinders or drums are used often, as are boxes of solid rectangular shape. It is recognized that a cube is a solid rectangle of equal dimensions.

Because both pallets and containers in the industrial material handling technology are facilitators of storage and movement of goods, they can both be considered disposable in some industries and susceptible to recycling in others. In this sense, recycling means both re-use for the same purpose and re-constitution into another product of the same composition.

Safety concerns of these material handling items are paramount in wise industries. Because a solid cylinder has a cylindrical surface between two flat circular surfaces, it is most unwieldy to maneuver and can be quite dangerous. Elaborate transport hand trucks, such as those seen in U.S. Pat. No. 5,042,962 (Lechnir), have been made to grip the reinforced rims of the drum where the cylindrical surface joins the flat circular surfaces. Otherwise, a curved surface is being restrained on a flat or slightly curved hand truck frame with straps, leaving the handler and those around that person susceptible to danger of slippage or strap breakage of several hundred pounds of momentum on a curved edge or surface.

Increasingly, environmental concerns are also quite important in wise industries. A metal drum, once emptied, requires expense to transport as a return item to its producer or to dispose as metallic waste. Neither of those options is particularly economical. Far more often, a drum of corrugated paper reinforced with metal chimes at the junction of flat and curved surfaces is used. But re-use of these drums faces the same poor economics as does a metal drum. Re-constitution of the paper portion and the metal portion requires additional time and effort. Disposal is increasingly an unavailable choice, especially as solid waste for landfill capacity reasons and environmental concerns.

SUMMARY OF THE INVENTION

What the art of material handling needs is a new system of moving and storing liquids or small-size-solids which allows the containers to be easily and safely handled during storage placement and movement and which also is economical after the containers have served their original storage and movement purposes.

The present invention solves those problems by providing a new system of material handling pallet and material handling transporter to be used in conjunction with a solid rectangular box-shaped container, preferably made entirely of one type of recyclable material. Again, use of recyclable in respect of this invention means both re-use as a container or re-constitution as another article made of that same type of material.

The present invention is a combination of interacting elements of container, pallet, and transporter, designed to work together to bring safety and economy to the industrial manufacturing or warehouse floor.

The present invention begins with the box-shaped container, a product already commercially available and employs a novel modification to both the pallet and transporter elements of the system. While it is also true that both the pallet and the transporter have value independently of the other elements, it is the entire system which benefits from the intermeshing features of these elements.

One aspect of the present invention is a material handling system, comprising: (a) at least one solid rectangular storage container for liquid or solid items; (b) a pallet upon which the container sits; and (c) a transporter which is adapted to move the container from the pallet; wherein the pallet has a structure to permit both movement of the pallet and the container and lifting of the container from the pallet and movement independent of the pallet; and wherein the container on the transporter can be moved by human power. Preferably, the container is made essentially of one type of material An advantage of the invention is the ability of the container to be recycled without separation of different materials into different recycling streams. Another advantage of using a solid rectangular container is the ability to maximize use of storage space, as compared with cylindrical drums, because there is no gap between boxes of rectangular sides as compared with contiguous cylinders.

Another advantage of the invention is the ability to use transporter, under human power, also called a hand truck, to move and maneuver a heavy container from one location to another, without moving the supporting pallet, such as when only one raw material container of many is needed at the manufacturing machine or when finished goods are ready to be moved to the shipping assembly point to join other finished goods containers.

Additional advantages will become apparent as one reads about the following embodiments of the invention in view of the following drawings.

EMBODIMENTS OF THE INVENTION

Material Handling System

Figure 1:
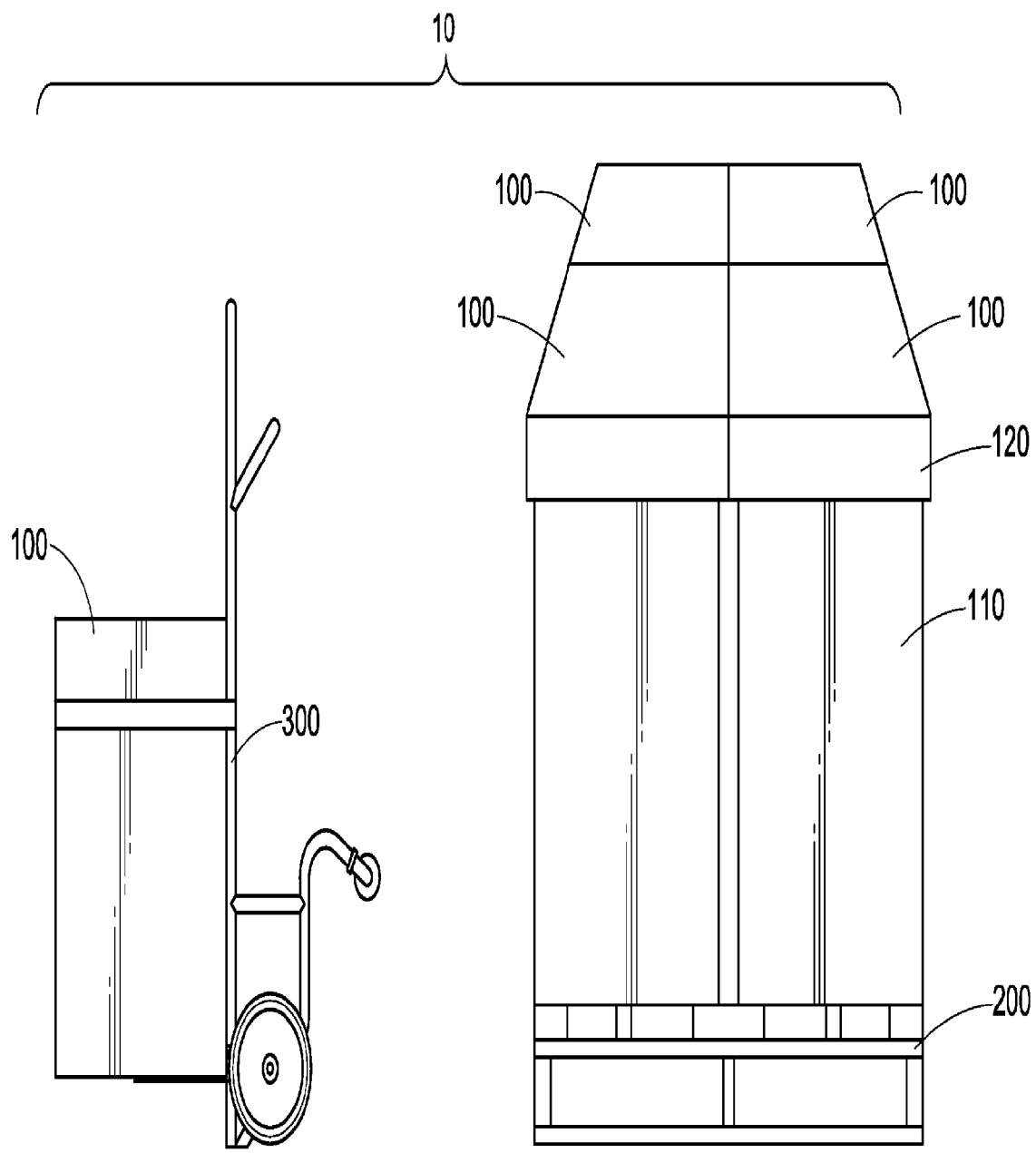
FIG. 1 is perspective view of the material handling system of elements of the container and pallet, shown in a storage condition, and transporter shown in ready condition.

FIG. 1 illustrates one embodiment of the invention. It is to be understood that the variables and alternatives described below with respect to each of the elements can be combined in any suitable fashion to establish many different combinations and, therefore, many different embodiments of the invention.

System, generally 10, comprises at least one solid rectangular container 100, a pallet 200, and a transporter 300. As shown, each pallet 200 is designed to accommodate up to four containers, 100, which as explained below, can be transported together on the pallet 200 or individually using the transporter 300.

As compared with four drums on a conventional pallet, the four containers, 100, utilize all storage space above the surface of the pallet. Using simple geometry, one can calculate that four cubes of 1 foot×1 foot×1 foot size on a pallet provide 27% more storage capacity as compared with four drums of 1 foot diameter×1 foot height. Therefore, one can gain either 27% more storage capacity if the containers are the same height as drums or 27% more storage space for other items on storage racks if the height of the container is reduced by 27%. For those industries where the storage racks are standardized dimensions, one can gain 27% storage capacity in the bulk liquid or solid items being stored per container. For those industries where the materials are quantified based on a standard drum size, the container can be reduced in capacity to match the drum's capacity, allowing more containers per unit volume in the storage section of the warehouse.

Solid Rectangular Container

The system of the present invention uses solid rectangular containers. "Solid rectangular" refers to the box-shape of the container, not that its volume is entirely solid. Indeed, any combination of liquid or solid items can be stored in bulk in the container. Any type of item used during manufacture can be contained: raw materials, work-in-progress, or finished goods. In FIG. 1, a typical container 100 has a storage chamber 110 and a lid 120 and is configured and structured to contain approximately 250 pounds (114 kg.)

Solid rectangular containers of industrial size and scale are well known in the art. For example, U.S. Pat. No. 4,398,902 (Mangum); U.S. Pat. No. 5,266,148 (Keech et al.); and U.S. Pat. No. 6,357,654 (Gardner et al.) all disclose types of box-shaped, solid rectangular corrugated paper containers, the disclosures of which are incorporated herein by reference.

All of these patents are granted to Weyerhaeuser Company, a worldwide leader in the manufacturing of cellulosic-based packaging products. Any of Weyerhaeuser's SpaceKraft™ brand intermediate bulk container products or Tri-Wall™ brand heavy duty triplewall packaging products are suitable for use in the present invention. More information about these products can be found at the "Bulk Packaging" section of www.weyerhaeuser.com. Most preferably, container 100 can be a "Half Slotted Container with a 1-2-3 Locking Bottom." This structure has a container with no top flaps and an assembly or disassembly which creates the bottom in three motions.

One embodiment of the invention uses Weyerhaeuser Tri-Wall brand boxes having the following dimensions: 21 inches×21 inches×35 inches (53.34 cm×53.34 cm×88.9 cm) for the container itself and a suitable size for the lid of the container. This permits 15,435 in.$^3$ or 8.93 ft.$^3$ (252,934 cm$^3$ or 0.2529 m$^3$) of storage capacity, which also permits four of such boxes to fit on a conventionally sized pallet of 44 inches× 44 inches (3.66 ft×3.66 ft or 1.12 m×1.12 m). In this embodiment, the height of the boxes was chosen to be reduced by 27% to approximate the same capacity as a conventional 55 gallon drum bulk container.

Preferably the containers of the present invention are entirely made of one material. In the case of the Weyerhaeuser Tri-Wall brand bulk packaging, the boxes are constructed entirely of corrugated paper, making recycling quite economical and convenient, either re-use or re-constitution into other products made of paper. Significant to this preferred embodiment, and a distinct advantage over paperboard drums reinforced with metal chimes, there are not any other materials in the containers which complicate re-constitution. Also, if one proceeds with solid waste disposal, there is no need to separate out any metal from the corrugated paper before burning, composting, or the like.

Solid rectangular containers are also preferable over cylindrical drums because they are designed to be collapsible prior to or after principal use. This feature, unavailable in drums especially those reinforced with metal rims, also aids in storage before or after usage and other transport when the bulk liquid or solid items are not stored therein.

Pallet

Figure 2:
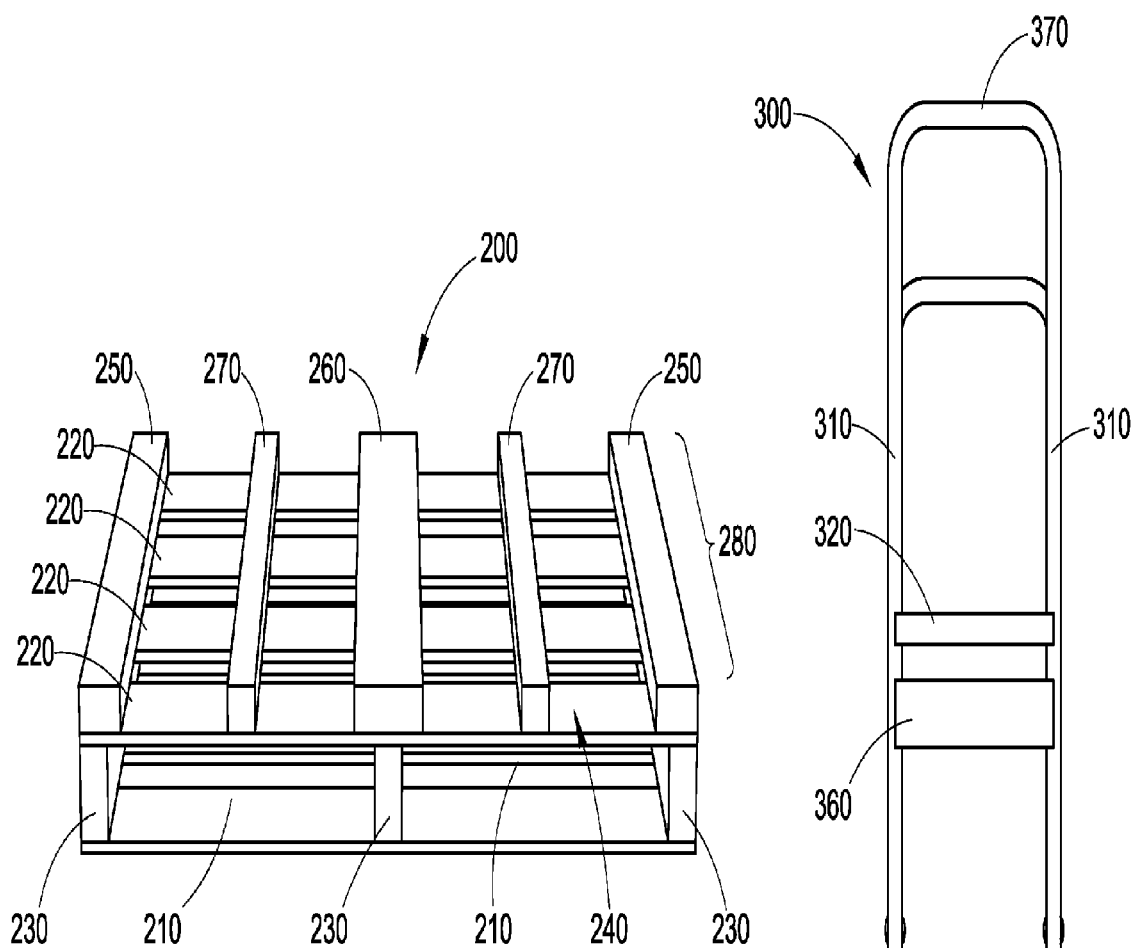
FIG. 2. is a perspective view of the pallet of the material handling system.

As seen in FIG. 1, pallet 200 needs to be strong enough to support as many as four containers 100. As seen in FIG. 2, pallet 200 has many conventional features but also a few new features novel to the system of this invention.

As with conventional pallets, pallet 200 is constructed principally of a plurality of lower deck boards 210, a plurality of upper deck boards 220 in alignment with the lower deck boards 210, and a plurality of stringers 230 transversely arranged between the deck boards 210 and 220. The number of deck boards 220, collectively constituting the upper surface 240 of pallet 200, can vary from as few as 4 to as many as 7 boards and preferably between 5 and 7 Likewise, the number of deck boards 210 can vary across the same range, preferably as the same number as deck boards 220.

The number of stringers can vary from as few as 2 and as many as 4, with 3 being appropriate support and separation of deck boards 210 and 220. The height of stringers 230 determines the separation height between deck boards 210 and 220 and the space within which a conventional forklift truck can insert its tines for lifting of the pallet 200. The height can range from about 3 to about 6 inches (about 7.62 to about 15.24 cm). In the embodiment shown in FIG. 2, the height of the stringers 230 are 3.5 inches (8.9 cm.)

The conventionality of pallet 200 ends with the deck board/stringer/deck board construction. Because of at least two reasons, the pallet has rising above surface 240 a series of parallel ribs of the same height but various widths. Flanking the surface 240 are two edge ribs 250, and bisecting the surface 240 is one center rib 260. Equidistant between each edge rib 250 and the center rib 260 is a support rib 270. The orientation of ribs 250, 260, and 270 to surface 240 can be parallel with stringers 230 or perpendicular to stringers 230, according to user preference. In the former alignment, access to the containers 100 on pallet 200 is from the same direction as access to the combination of pallet 200 and containers 100. In the latter alignment, access to containers 100 is orthogonal to access to the pallet 200 for movement of containers 100 from pallet using transporter 300 arriving from a different direction than that used by the forklift truck for movement of the pallet 200.

Together, the upper surfaces of ribs 250, 260, 270 constitute a container support surface 280 raised above the surface 240 of pallet 200. The height of ribs 250, 260, 270 can range from about 0.75 to about 1.5 inches (from about 1.9 cm to about 3.81 cm). In the embodiment shown in FIG. 2, the height is 1 inch (2.54 cm.)

One reason for the use of ribs 250 and 260 is to provide a space above surface 240 and below surface 280 (upon which container 100 rests) within which a transporter 300 can insert its platform or tines to lift and move container 100 from pallet 200.

One reason for the use of ribs 270 is to provide center line support to container 100 which is, preferably, not otherwise reinforced with a material such as metal which is different from the type of material constituting container.

The width of support ribs 270 can range from about 0.75 to about 2 inches (1.9 cm to about 5.08 cm) and preferably is 1 inch to minimize the amount of obstruction for the transporter 300 to enter the space between surfaces 240 and 280. The width of edge ribs can range from about 1.5 to about 3 inches (3.8 cm to 7.62 cm) and preferably is 2 inches to provide at least two inches of edge support for a container approximately 21 inches wide. The width of center rib 260 can range from about 3 to about 4 inches (7.62 cm to 10.16 cm) and is preferably 4 inches to provide two inches of support to adjacent containers 100 on the pallet 200.

Therefore, for a container 100 of approximately 21 inches width, there is a spacing of 2 inches of support, 8 inches of gap, 1 inch of center line support, 8 inches of gap, and 2 inches of support. Moreover, the ribs 250, 260, 270 extend the entire depth of the container 100 on pallet 200, providing about 105 in.$^2$ of support for a container 100 having a footprint of about 441 in.$^2$.

Alternatively, ribs 250, 260, 270 need not extend nearly the entire depth of surface 240. Such ribs can be segmented to at least provide along the edges and in a center post of 1 inch×1 inch (2.54×2.54 cm). If so configured, then the space for insertion of the transporter can approach from two different sides of pallet 200 to lift and remove a container 100 from surface 280.

Pallet 200 can be made from any sturdy material, usually engineered to support about 1000 pounds (454 kg.) of bulk goods in one or more containers. Most often, wood is used, particularly hardwoods or a sturdy coniferous wood if hardwoods are unavailable, because of the expense of returning and re-using pallets in developed nation industrial cost structures. Pallet can be held together with any type of sturdy fastener. Most often, nails are used. However, metal pallets and plastic pallets are also used frequently. For example, U.S. Pat. No. 6,352,039 (Woods et al.) owned by PolyOne Corporation discloses a plastic pallet, the disclosure of which is incorporated by reference herein. In certain industries, such as the food industry, regulations require non-wood pallets.

Transporter

Transporter 300, as seen in FIGS. 1, 3, 4, and 5, has a combination of conventional features and new features. Transporter 300 is designed for use by a single person and is engineered to safely and easily move a container 100 filled with bulk liquid or solid items from pallet 200 to another location. Alternatively, transporter can be powered in any manner that is presently used to power a forklift truck or other material moving equipment. Most often, because the use of transporter 300 is to move one container 100 relative to a pallet 200 of several containers, a human-powered transporter is more convenient because the movement of container 100 is likely to occur in a more confined area than where powered equipment normally operates.

Transporter 300 comprises a frame of tubes 310 and crossbars 320 with a platform 330 extending orthogonally therefrom at an junction which also serves as an axis along which reside two wheels 340 connected by an axle 342. To provide additional safety and support, at the floor end of tubes 310 is a transport frame 350 comprised of a set of curved tubes 352, a crossbar 354, two connecting bars 356, and two caster wheels 358. Casters 358 provide the steering of the transporter 300 while wheels 340 provide the majority of the drive from the power of the person pushing the transporter 300. For convenience, a foot bar (not shown) can be included to help exert leverage when lifting the container 100 from pallet 200 by tilting the transporter 300 slightly and rolling the transporter 300 away from pallet 200.

Wheels 340 can be of sufficient size, tread, and bearing to allow smooth operation of a loaded transporter 300 in all directions. Ten inch (25.40 cm) diameter load wheels can be used to provide adequate integrity to carry the container load under normal conditions, approximately 250 pounds (114 kg.) A soft round thermoplastic rubber tread, on a polypropylene hub, can offer little rolling resistance, high capacity, and vibration free/non-jarring motion over debris, thresholds, etc. one might encounter on a manufacturing factory floor. Wheels 340 also can benefit from the use of precision sealed ball bearings, preferably 0.625 inch (1.59 cm) bore. Alternatively, one could utilize semi-pneumatic wheels as wheels 340.

One embodiment of transporter 300 is approximately 58 inches (147 cm) tall and 20 inches (50 cm) wide and 34 inches (87 cm) deep.

Figure 3:
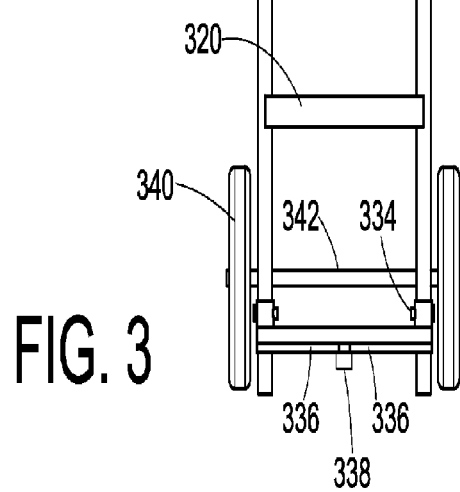
FIG. 3 is a perspective view of a transporter of the material handling system in an unloaded condition.
Figure 4:
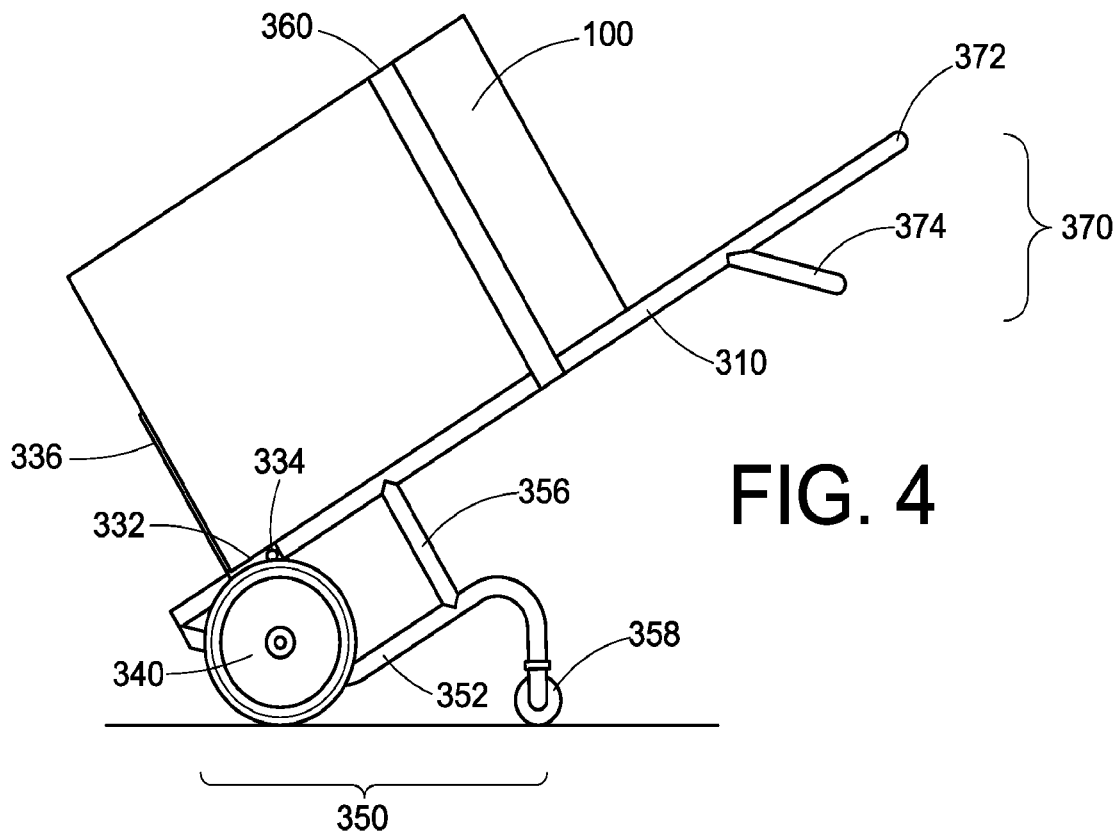
FIG. 4 is a perspective view of a transporter in a loaded condition.

When the transporter 300 is positioned to take on the load of a container 100, rotation of the frame about the axis of junction between tubes 310 and platform 330 to alter the position of platform 330 from parallel to the floor to angled to the floor. FIGS. 1 and 3 show the transporter 300 in a vertical position for loading and unloading of container 100. FIG. 4 shows the transporter 300 in a reclining position for movement of container 100.

Figure 5:
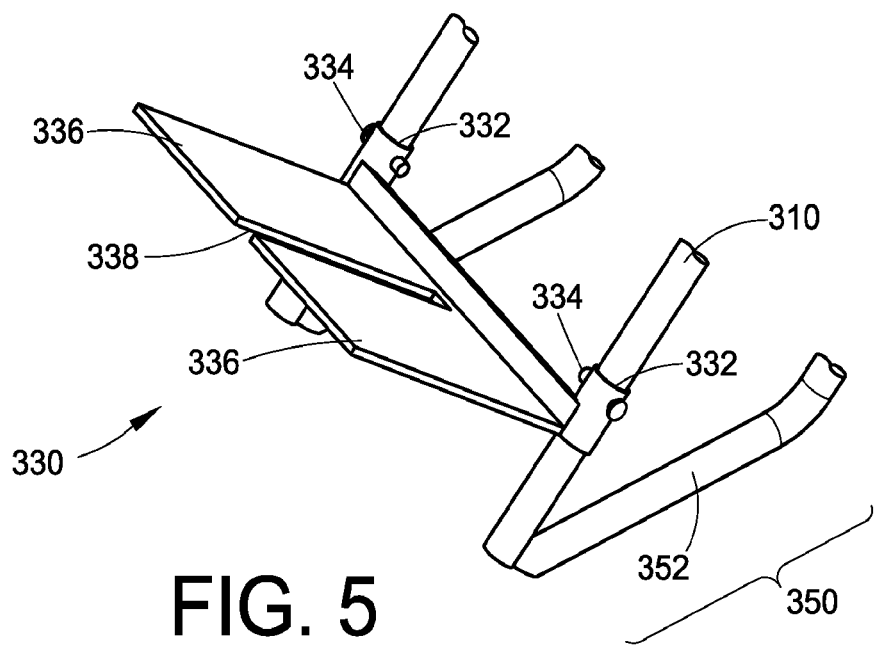
FIG. 5 is a fragmented view of one aspect of the transporter.

Conventional hand trucks have their platforms to be flush with the surface of the floor. Unconventionally, transporter 300 has an adjustable platform 330, in that platform 330 has a tubular ends 332 of an inside diameter slightly larger than the diameter of tubes 310 and each end having a hole bored in the same axis as the axle of transporter 300. Near the floor end of tubes 310 are one or more holes bored in the same axis as the axle of transporter 300. Aligning holes on tubular ends 332 and tubes 310, permitting the platform to be raised from the floor level to pallet level, allows mechanical locking pins 334 to firmly secure the height of the platform at a useful level relative to the space between surface 240 and 280 of pallet 200. FIG. 5 shows a detailed view of the locking pins 334 in place to maintain the level of platform 330 above floor level.

Alternatively, adjustment of the height of platform 330 can be accomplished by any means for releasably securing the height of a horizontal element relative to a vertical element, such as by the use of a ratcheting brake winch, a sprocket and chain adjustment mechanism (both manually activated), or a miniature hydraulic unit.

In the present embodiment shown in FIG. 3, the platform has two positions, regular flush with the floor and elevated for use with pallet 200. However, the elevation of platform 330 can be variable at any desired height, so long as the means for releasably securing is sturdy and durable to fix and maintain the height of this load bearing element of the transporter 300. In the present embodiment, the height of platform 330 is about 4.75 inches (12.1 cm) to be higher than the combined height of the lower deck boards 210, upper deck boards 220, and stringers 230, that is to say, the height of surface 240. The thickness of platform 330 should be enough to support the load of container 100 but thin enough for platform 330 to move into the space between surface 240 and surface 280, the lowest surface of container 100. Preferably, 7 gage steel is used.

Locking pins 334 need to be of adequate diameter and material to carry the 250 pound (114 kg.) load safely. A quick release spring plunger is preferably used, allowing the pin to be inserted and removed with little resistance. A button, when pressed, removes the pressure from the spring loaded ball. In doing so, the "lock" effect of the ball is removed. The ball, at the end of the pin remains firm when the release button is not depressed. The quick release pin is tethered to a location on elsewhere on the transporter 300. A second pin style for pins 334 can also be used, one which has a spring loaded ball lock device. However, that embodiment does not have a release button to relieve the ball tension, increasing manual labor but saving on expense of the pins 334.

Because pallet 200 has center support ribs 270, platform 330 on transporter 300 is unconventional. The platform 330 is split into two toe plates, platens, or tines 336 with a gap 338 that is slightly wider that the width of ribs 270. Each toe plate is of substantial size and material to minimize deflection of container 100 under normal operating conditions, with, as mentioned above, a preferred embodiment using approximately 7 gage steel for toe plates 336.

If there is a variable height feature, one can add a means for elevating the platform 330 permits the height of the container 100 to be altered on the transporter 300 after container 100 is lifted from pallet 200. Conceivably, container 100 could be delivered to a higher elevation or to the floor, depending on the next location to which transporter 300 moves container 100. If the height of platform 330 is fixed, any receiving location of the same or lower elevation, compared with surface 280, can allow easy and safe depositing of container 100 for subsequent storage, use, or movement. Again, one could use a ratcheting brake winch, a sprocket and chain adjustment mechanism (both manually activated), or a miniature hydraulic unit to provide the power to adjust the heights of toe plates 336.

Transporter 300 also has a securement strap 360 which can be cinched about the outer surfaces of right-angular container 100 and a dual handle assembly 370 ergonomically oriented to permit easy maneuvering of the transporter 300 when in its loaded or unloaded condition.

One embodiment of strap 360 is a combination of 0.125 inch×1 inch (0.32 cm×2.54 cm) web material, a hook having a one inch (2.54 cm) inside diameter, and a cam style retaining block. The block is uni-directional until the cam lever is depressed. The strapping pulls through easily, but tension in the opposing direction forces the cam to bind more securely. Another embodiment is a strap device which has a retractable strap similar to an automotive seat belt. This method neatly stores the strap. It recoils around a shaft via a coil spring, eliminating a potential tripping hazard.

The dual handle assembly has one handle 372 for maneuver of the transporter 300 while upright as seen in FIG. 1 and a second handle 374 while reclining as seen in FIG. 4.

Transporter 300 can be made from sturdy metal, such as steel pipe of approximately 0.75 inch (1.9 cm) diameter, except for polymeric or rubber wheels 340 and casters 358. Junctions can be completed by mechanical fasteners or by welding. The former permits easy assembly/disassembly but might not be as sturdy as a welded uni-body construction. Painting will protect the metal during usage. Lubrication of the wheels 340 and casters 358 will permit "like-new" maneuverability of transporter 300.

Subtly, engineering of transporter 300 takes into consideration the center of gravity of transporter when upright, such as inserting toe plates 336 into pallet 200, and during initial lifting or final depositing of container 100 and also the center of gravity during movement of the transporter 300 in the position where both wheels 340 and casters 358 are contacting the floor. A comparison of FIGS. 1 and 4 will show the extremes of these two positions of container 100 on transporter 300.

The double, reversing, curvature of frame 350 from the floor end of tubes 310 to the casters 358 provides a center of gravity in all situations which has the principal mass of a filled container 100 over a plane between wheels 340 and casters 358. One embodiment of frame 350 includes a first curvature near the wheels 340 of approximately 48° and a second curvature near the casters 358 of approximately 122°. As seen in FIG. 4, the contact of casters 358 to the floor causes an angle of approximately 30° for the container 100 from an upright, orthogonal position of container as seen in FIG. 1 on transporter 300. Nonetheless, the center of gravity of heavy container 100 remains within a safety range of control. Because container has right angular sides, with the use of securement strap 360, one can be confident of a secure transport of container 100 on transporter 300 in a reclining position as seen in FIG. 4 from pallet 200 to another location.

Casters 358 can be the same construction of wheels as used for wheels 340 or can be other structures, such as a 3 inch (7.6 cm) stem caster conventionally and commercially available and used on large appliances or furniture or industrial products.

With securement of the container 100 by strap 360 before tilting from fully vertical to transport angle, a single person can easily maneuver a filled container (approximately 250 pounds (113 kg) of bulk solids such as plastic pellets) with safety against loss of control. The transporter 330 has sufficient width (approximately 20 inches (50 cm) wide and 34 inches (87 cm) deep as shown in FIGS. 1 and 3) relative to the width of container 100 (approximately 21 inches) and large diameter wheels 340 (approximately 10 inches (25.40 cm)) well outboard of toe plates 336 that tipping in the direction of the axle between wheels 340 is most unlikely. The double, reversing curvature of frame 350 and permanence of connecting bars 356 between frame 350 and tubes 310 means that tilting of a filled container 100 can only go so far as until casters 358 contact the ground, resulting in a container 100 reclining at a 30° angle relative to the floor (60° angle relative to vertical). With strap 360 about the container 100, the transporter will minimize the loss of the container in a direction opposite the operator, especially after the container 100 has been tilted into the "wheel and caster" orientation shown in FIG. 4.

USEFULNESS OF THE INVENTION

The system 10 of this invention begins with recognition of the value of a box-shaped container 100, preferably made of a single, recyclable material, providing increased capacity and preferably easier recycling. From there, the pallet 200 and transporter 300 depart from convention in unexpected ways to make it possible to safely and easily move, manually, a bulk container 100 from pallet 200 to another location.

The pallet 200 in all respects serves as a conventional structure to deliver as much as 100 pounds of bulk goods but also is configured to permit a removal of one of the several containers 100 using a convenient additional surface under which the specially configured transporter 300 can safely and easily operate.

Freed from the confines of a securing a cylindrical bulky, heavy container, the use of system 10 provides more storage capacity, easier handling, and safer material transport.

The invention is not limited to the above embodiments. The claims follow.

What is claimed is:

1. A material handling system, comprising:
   (a) at least one solid rectangular storage container for liquid or solid items;
   (b) a pallet upon which the container sits; and
   (c) a transporter which is adapted to move the container from the pallet;
   wherein the pallet has a structure to permit both movement of the pallet and the container and lifting of the container from the pallet and movement independent of the pallet;
   wherein the pallet has an upper surface and a series of ribs rising above the upper surface;
   wherein the ribs comprise a center rib, two edge ribs, and two support ribs combining to provide a container support surface;
   wherein the ribs extend nearly an entire distance of the upper surface from the front of the pallet to the back of the pallet;
   wherein the transporter has a platform with a split forming two toe plates and a gap between the toe plates that is slightly wider than the width of the support ribs;
   wherein the transporter has two larger wheels for vertical alignment of the container on the transporter and two smaller wheels to be used with the larger wheels for alignment of the container on the transporter at an angle to a floor;
   wherein the transporter has a frame of tubes and wherein the frame rotates about an axis of junction between the tubes and the platform to alter the position of the platform from parallel to a floor to angled to the floor with the container reclining at about a 30° angle relative to the floor;
   wherein the transporter has a double, reversing curvature frame from the tubes to the two smaller wheels, wherein the double, reversing, curvature of the frame from the tubes to the smaller wheels provides a center of gravity in all situations which has the principal mass of a filled container over a plane between the larger wheels and the smaller wheels:
   wherein the transporter has a dual handle assembly, wherein one handle is for maneuver of the transporter when upright relative to the floor and a second handle for maneuver of the transporter when reclining at an angle relative to the floor;
   wherein the platform of the transporter has at least two positions, comprising regular flush position with a floor and elevated position for use with the pallet wherein the platform has tubular ends of an inside diameter slightly larger than diameter of tubes of the frame, wherein each end has a hole bored in the same axis as the axle of the transporter, whereby aligning holes on the tubular ends and the tubes of the frame permits the platform to be raised from a floor level to a pallet level using mechanical locking pins to firmly secure height of the platform at a useful level relative to the upper surface; and
   wherein the container on the transporter can be moved by human power.

2. The system of claim 1, wherein the container support surface ranges from about 1.9 to about 3.81 cm above the upper surface, and wherein the space between upper surface and container support surface is sufficient to permit the transporter to be inserted to lift and move the container from the pallet.

3. The system of claim 1, wherein the upper surface of the pallet is made of a plurality of upper deck boards in alignment with a plurality of lower deck boards, both being connected to stringers transversely arranged between upper deck boards and lower deck boards, which elevate the upper deck boards above the lower deck boards to create a space above a floor and the upper surface.

4. The system of claim 3, wherein the ribs are parallel with the stringers.

5. The system of claim 3, wherein the ribs are perpendicular to the stringers.

6. The system of claim 2, wherein the ribs are segmented to permit the transporter to lift the container from either of two different sides of the pallet.

7. The system of claim 1, wherein the pallet is made from a material selected from the group consisting of metal, wood, plastic, and combinations thereof.

8. The system of claim 1, wherein the transporter also has a securement strap to be used about the outer surfaces of the container.

9. The system of claim 1, wherein the double, reversing curvature frame has a first curvature near the larger wheels of approximately 48° and a second curvature near the smaller wheels of approximately 122°.

10. The system of claim 9, wherein the larger wheels are outboard of the toe plates.

11. The system of claim 1, wherein the container is made of a single composition to permit recycling both for re-use for the same purpose and re-constitution into another product of the same composition.

* * * * *